(12) United States Patent  
Garcia

(10) Patent No.: US 8,930,054 B2  
(45) Date of Patent: Jan. 6, 2015

(54) INTEGRATED ANTI-THEFT DEVICE FOR AN ELECTRIC BICYCLE

(71) Applicant: GM Global Technology Operations LLC, Detroit, MI (US)

(72) Inventor: Pierre-Olivier Garcia, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/777,116

(22) Filed: Feb. 26, 2013

(65) Prior Publication Data

US 2013/0231810 A1 Sep. 5, 2013

(30) Foreign Application Priority Data

Mar. 5, 2012 (DE) .......................... 10 2012 004 176

(51) Int. Cl.
| | |
|---|---|
| *G05B 11/01* | (2006.01) |
| *B62M 6/80* | (2010.01) |
| *B62M 6/45* | (2010.01) |
| *B62H 5/00* | (2006.01) |

(52) U.S. Cl.
CPC . *B62M 6/80* (2013.01); *B62M 6/45* (2013.01); *B62H 5/001* (2013.01)
USPC .......................................................... 701/22

(58) Field of Classification Search
CPC .................................. G06Q 10/87; B62H 3/02
USPC .......................................................... 701/22
See application file for complete search history.

(56) References Cited

U.S. PATENT DOCUMENTS

| | | | |
|---|---|---|---|
| 2009/0181826 A1 | 7/2009 | Turner | |
| 2010/0011894 A1* | 1/2010 | Wang et al. | ............... 74/411.5 |
| 2010/0228405 A1* | 9/2010 | Morgal et al. | ................... 701/2 |
| 2010/0280700 A1* | 11/2010 | Morgal et al. | ................ 701/29 |
| 2011/0015814 A1* | 1/2011 | Starr et al. | ................... 701/22 |
| 2013/0314205 A1* | 11/2013 | Neupert | ..................... 340/5.2 |

FOREIGN PATENT DOCUMENTS

| | | |
|---|---|---|
| DE | 19711798 A1 | 11/1997 |
| DE | 202009014347 U1 | 1/2010 |
| EP | 0686522 A2 | 12/1995 |

OTHER PUBLICATIONS

German Patent Office, German Search Report for German Application No. 10 2012 004 1764 dated Nov. 9, 2012.

* cited by examiner

*Primary Examiner* — Thomas Tarcza  
*Assistant Examiner* — Alex C Dunn  
(74) *Attorney, Agent, or Firm* — Ingrassia Fisher & Lorenz, P.C.

(57) ABSTRACT

A drive unit for an electric bicycle comprising an electric motor and an energy storage device is provided. The drive unit includes a locking mechanism for locking the energy storage device and a control device. The control device is operatively connected to an actuator of the locking mechanism for the energy storage device. The actuator is fastened detachably to the drive unit. The control device is configured to evaluate signals received via a terminal in order to release or block one function of the drive unit as a function of at least one received signal. An electric bicycle, a method for operating an electric bicycle and a computer readable medium also are provided.

17 Claims, 5 Drawing Sheets

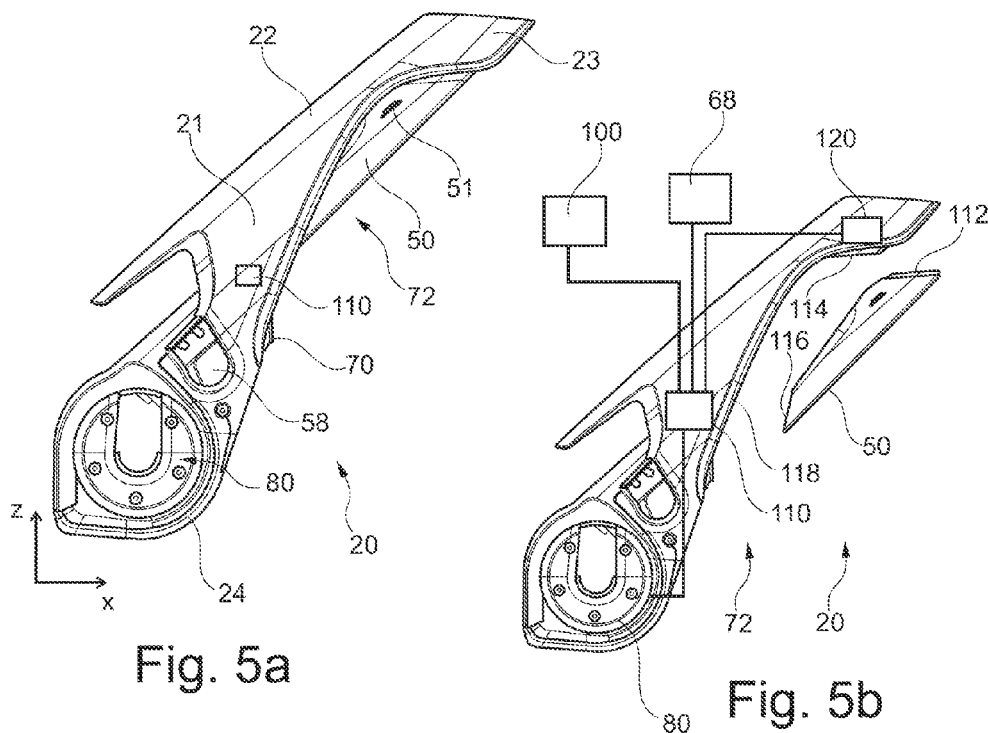
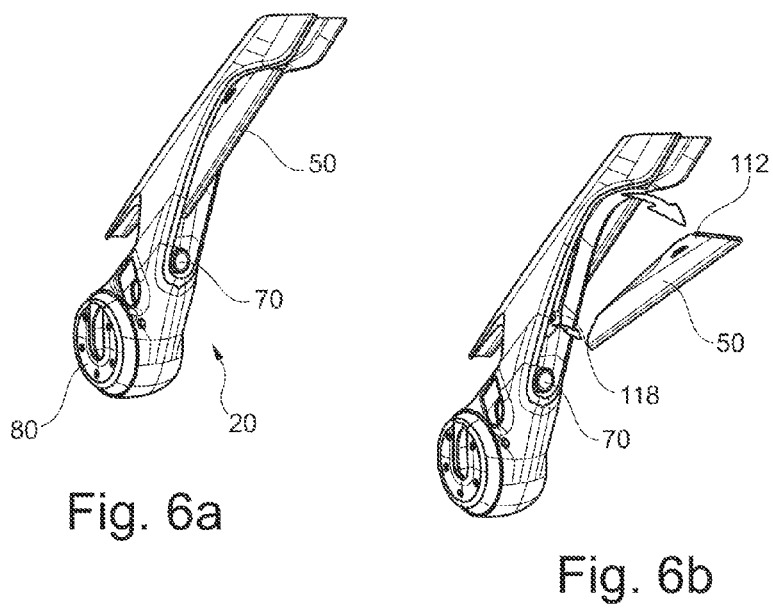

INTEGRATED ANTI-THEFT DEVICE FOR AN ELECTRIC BICYCLE

CROSS-REFERENCE TO RELATED APPLICATION

This application claims priority to German Patent Application No. 10 2012 004 176.4, filed Mar. 5, 2012, which is incorporated herein by reference in its entirety.

TECHNICAL FIELD

The technical field relates to an integrated anti-theft device for a bicycle, in particular for an electric bicycle.

BACKGROUND

Electric bikes or electric bicycles typically have an electric motor configured as an auxiliary drive, which can be mounted as desired in the front wheel or in the rear wheel as a hub motor or also in the bottom bracket of such a bicycle in the form of a so-called mid-engine. The electric motor here provides a driving assistance that can be demanded by a pedal actuation initiated by the end user. The power supply to the electric motor is typically provided here via a rechargeable battery provided detachably on the bicycle. In addition to limited and also unlimited pedal assist, electric bicycles can also have a pedal-independent auxiliary drive. The rechargeable batteries are frequently carried on or at a luggage carrier on the bicycle.

The comparatively high purchasing costs of electric bicycles certainly pose a problem particularly in regard to the frequency of thefts of such bicycles. In addition, the energy storage systems in the form of rechargeable batteries to be carried on the bicycle are comparatively expensive. Since these can frequently be provided detachably and exchangeably on the bicycle, a non-detachable connection to the bicycle for anti-theft protection thereof does not generally come into consideration.

It is therefore at least one object herein to provide an improved anti-theft concept, in particular for electric bicycles, which prevents any unauthorized removal of an energy storage system and any unauthorized use of the electric bicycle effectively and means which are as simple and cost-effective to implement as possible. In addition, other objects, desirable features and characteristics will become apparent from the subsequent summary and detailed description, and the appended claims, taken in conjunction with the accompanying drawings and this background.

SUMMARY

In accordance with an exemplary embodiment, a control device is configured for a drive unit of an electric bicycle comprising an electric motor and an energy storage device. The control device is configured here to evaluate signals received via a terminal in order to release or lock or block at least one function of the drive unit as a function of at least one received signal. The terminal is configured here not as a part or a component of the control device but should be configured completely autonomously of the control device, in particular as a mobile terminal or one that can be carried by the user.

In an embodiment, the control device is configured in such a manner that it communicates bidirectionally with the terminal. That is, the terminal can on the one hand function as an input device in order to send commands to the control device. On the other hand, however, the control device can also send signals to the terminal in order to inform the user about the operating state of the drive unit or the electric bicycle.

The control device is, for example, an integral component of the drive unit and can function as a controller of the electric motor provided at the drive unit and/or of the energy storage system which can preferably be disposed directly at the drive unit.

Functions of the drive unit to be released and/or to be blocked are, for example, the release and exchange of an energy storage system possibly configured as a rechargeable battery and the operation of the electric motor itself. It is further feasible that the motor even prevents a pure pedal-actuated or muscular-force actuated use of the electric bicycle. Thus, it can be provided in particular to also use the electric motor as a brake so that when a function is locked or blocked, a purely mechanical operation of the electric bicycle is prevented or at least rendered significantly difficult.

In this way, both the energy storage system and also the electric bicycle overall can be effectively and particularly efficiently secured against theft and unauthorized use.

According to an embodiment, the control device is operatively connected to a preferably electromechanical actuator of a locking mechanism, where the locking mechanism is configured for the energy storage device that can be fastened detachably to the drive unit. The actuator is here suitably coupled on the side of the drive unit, in particular to a drive-side locking mechanism so that a mechanical unlocking of the energy storage system can only be accomplished via the actuator and ultimately via the control device which actuates the actuator. If the control device does not release the actuator and with this the energy storage system for exchange, the relevant energy storage system cannot be decoupled in an intended manner from the drive unit, possibly for purposes of an exchange.

According to a further embodiment, the control device is further configured to transfer the locking mechanism into a release configuration only when a predefined unlocking signal is received via the terminal. The communication between the control device and terminal can here already provide an adequate and inherent safety function. Without connection or communication between terminal and control device, the unlocking function can be blocked or locked by default.

Depending on communication protocol and mutual exchange of identification data, the unlocking function can be released by default in the event of an intended coupling of the terminal to the control device. That is, the structure of a connection or communication channel between the preferably mobile terminal the control device can preferably release the locking mechanism by default so that the end user need not necessarily select an explicit command at the terminal in order to be able to decouple the energy storage system.

However, it can naturally also be provided that the terminal is configured in such a manner that it provides an unlocking or locking function for the locking mechanism, which should be explicitly activated or deactivated by the end user via the terminal when necessary. Furthermore, the choice of an unlocking or locking function on the part of the terminal can be secured by means of a release code. A corresponding authorization enquiry can in this case be implemented either directly in the terminal or however on the side of the control device.

According to another embodiment, the control device is further configured to block any activation of the electric motor until a predefined release code is received via the terminal. In this way, the electric bicycle can be secured particularly simply against theft. For operation of the electric bicycle, coupling of the preferably mobile terminal to the control device is necessary here in any case.

The terminal can either be configured as a separate terminal to be provided next to the control device or specially configured for the electric bicycle concerned. The terminal is advantageously configured as a multifunctional terminal, for example, as a Smartphone, which has at least one program adapted to the control device or a corresponding application, which is preferably activatable or activated independently in the case of a data-transmitting coupling to the control device.

According to a further embodiment, the terminal is in this respect not only configured for control, that is for the selective release or for locking individual functions of the drive unit but can in particular function as input/output device, which can provide visually, audibly or haptically perceptible information or warning signals to the end user.

In this respect, it is further provided according to an embodiment that the control device is configured to interrogate the current operating status of the motor and/or the energy storage system and to transmit this to the terminal for display purposes for the end user. In particular, here for example, the charging state of the energy storage system as well as the current or average power input or power output of the electric motor can be displayed visually or audibly.

According to a further embodiment, the control device is configured for wired and/or wireless communication with the terminal. In particular, in the case of a wired communication, a holder matched to the particular terminal can be provided in the electric bicycle, which at the same time provides a data exchange between control device and mounted terminal. Here it is fundamentally feasible that the terminal provided with its own rechargeable battery can be charged via the control device and supplied accordingly with electrical energy.

Wired or wireless communication protocols can be implemented, for example, in the form of the Bluetooth or IEEE 802.11 Standard or similar data transmission protocols. In this case, it is not absolutely necessary to mount the terminal on the bicycle but the mobile terminal, for example, in the form of a Smartphone, can therefore be carried as keyless access by the end user. In this case, the terminal can serve as a wireless key and identification device, which releases or locks provided functions of the device in a predefined manner as soon as the terminal is located within a predefined distance from the control device.

According to another embodiment, a drive unit is provided for an electric bicycle having at least one electric motor and an energy storage system and having a control device as described previously. The drive unit here is preferably configured as frame components of the electric bicycle. Thus, the drive unit, for example, can function as a type of saddle tube or as a type of lower tube of an electric bicycle. Here it is in particular provided that the electric motor is operatively connected in a force-transmitting manner to the bottom bracket of the electric bicycle. Thus, it is fundamentally also feasible to configure the drive unit or its base part in the form of one or several rear wheel stays or chain stays possibly of a bicycle frame.

The drive unit can in this case comprise a module that is closed in itself having a base part which at the same time functions as supporting component of the two-wheel frame. At least one electric motor is disposed in the base part of the drive unit, which typically operates as an auxiliary motor for providing pedal assist, possibly according to the Pedelec principle. At least one energy storage system, for example in the form of one or several rechargeable batteries can further be disposed on the base part itself. Since the base part is configured as a supporting component of the two-wheel frame, it forms a mounting platform for further frame components of the two-wheeler, on which further supporting components of the two-wheeler frame can be fastened.

According to a further embodiment, an electric bicycle is provided having a previously described drive unit with the likewise previously described control device.

As a modification of this, however, the control device can also be provided separately from the drive unit on the electric bicycle. A preferred wired connection of the control device to the drive unit or to its electric motor and/or to a locking mechanism for the energy storage system would then need to be made manually however at least during a first assembly.

In a further independent embodiment hereof, a method for operating an electric bicycle is further provided, which comprises an electric motor, an energy storage system, and a previously described control device. The method for operating the two-wheeler in this case comprises the steps given hereinafter:

connecting a preferably mobile terminal to the control device, transmitting a signal corresponding to the function command from the terminal to the control device, and releasing or blocking at least one function of the drive unit as a function of the signal received by the control device.

In this case, the signal processing can take place in the control device or also in the terminal. In the case of a signal processing and signal evaluation in the terminal, however, an authentication or identification of one or more terminals is to be provided with the control device.

In an embodiment, it is further provided to specifically input a function command into the terminal, possibly the release of an energy storage system. However, it is also feasible that immediately after making the connection between control device and terminal, a predefined signal is automatically generated and sent to the control unit or generated there in situ.

According to another embodiment of the method, an unlocking function for releasing the energy storage system from the drive unit is provided on the terminal. The unlocking function is configured in such a manner as a result of an activation of the unlocking function, the energy storage system can be removed from the drive unit or can be exchanged.

Finally it is provided in a further embodiment that the terminal is configured for interrogating a user identification and the terminal and/or the control device only release an operation of the electric motor upon input of a predefined user identification or a corresponding release code or alternatively cancels its braking function in relation to a manual, purely muscle-operated drive of the electric bicycle.

It can also be provided that the control device sends a warning signal to the terminal in the event of unauthorized use of the electric bicycle. This function is particularly advantageous in the case of a wireless communication between terminal and control device. If the bicycle is specifically the subject of a theft, this can be detected upon non-authorized use by the control unit. A theft warning can then be transmitted by the control unit to the terminal, for example, configured as a Smartphone.

According to another embodiment, a computer program product is provided for operating an electric bicycle, where the electric bicycle comprises an electric motor, an energy storage system, and a control device and where the control device can be coupled to a terminal which is, for example, configured to be mobile. The computer program product can in this case be implemented in the control device and/or in the preferably mobile terminal. It has program means for connecting the terminal to the control device, preferably also program means for inputting at least one function command into the terminal. Furthermore, program means are provided for transmitting a signal corresponding to a function command from the terminal to the control device, and program means for releasing or blocking at least one function of the drive unit as a function of the signal.

According to a further embodiment, a device is provided for operating an electric bicycle, where the device comprises:
means for connecting a preferably mobile terminal to the control device,
means for transmitting a signal corresponding to a function command from the terminal to the control device, and
means for releasing or blocking a function of the drive unit as a function of the signal received at the control device.

It should generally be noted that all the features, advantages and exemplary embodiments described in the present case are equally valid for the control device, the drive unit, the electric bicycle and for the method and the computer program product for operation of the electric bicycle. In particular those features and advantages described in connection with the control device and/or the drive unit apply equally to the method and the computer program product, and conversely.

BRIEF DESCRIPTION OF THE DRAWINGS

The various embodiments will hereinafter be described in conjunction with the following drawing figures, wherein like numerals denote like elements, and wherein:

FIG. 5*a* is an isolated side view of a drive unit in accordance with an exemplary embodiment;

FIG. 5*b* is the drive unit of FIG. 5*a* with a dismounted energy storage system;

FIG. 6*a* is a perspective view of the drive unit of FIG. 5*a* with a mounted energy storage system in accordance with an exemplary embodiment;

FIG. 6*b* is a perspective view of the drive unit of FIG. 6*a* with a dismounted energy storage system;

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
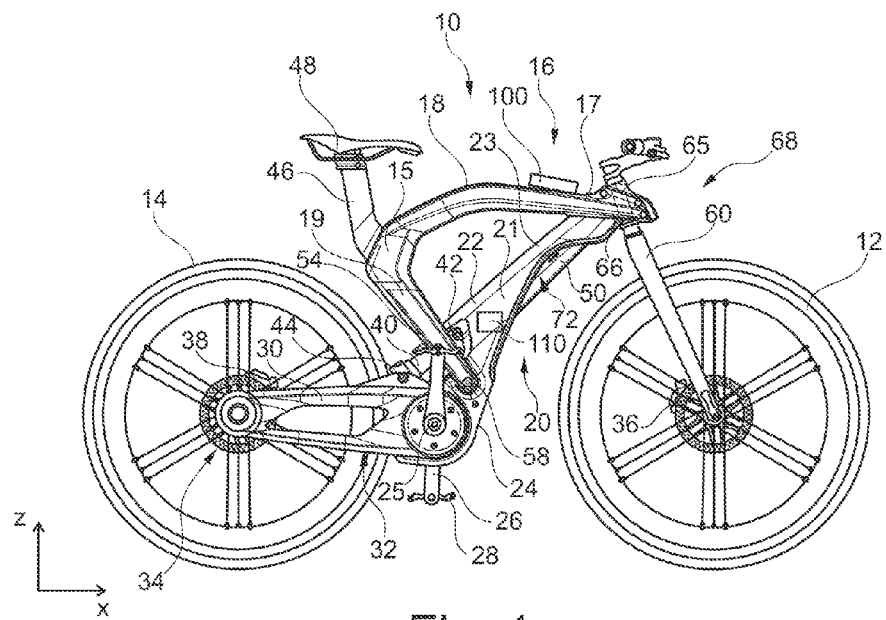
FIG. 1 is a side view of an electric bicycle provided with a drive unit, in accordance with an exemplary embodiment.
Figure 2:
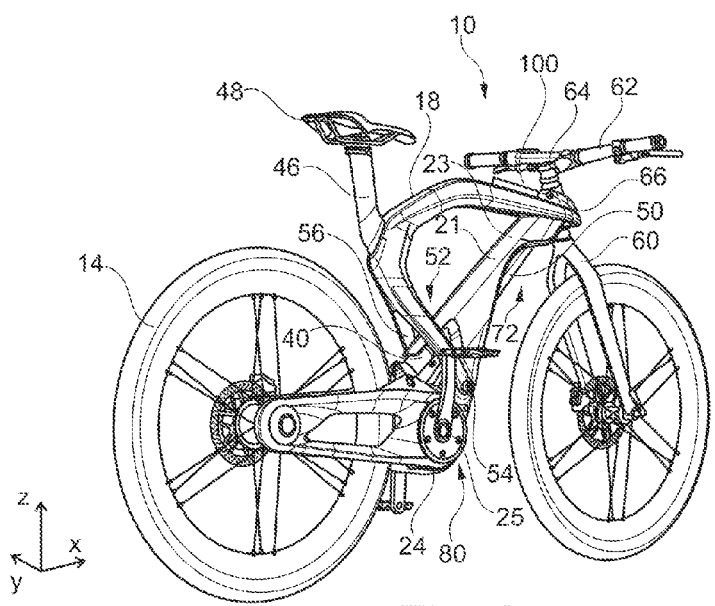
FIG. 2 is a perspective view of the bicycle of FIG. 1 when viewed obliquely from behind.
Figure 3:
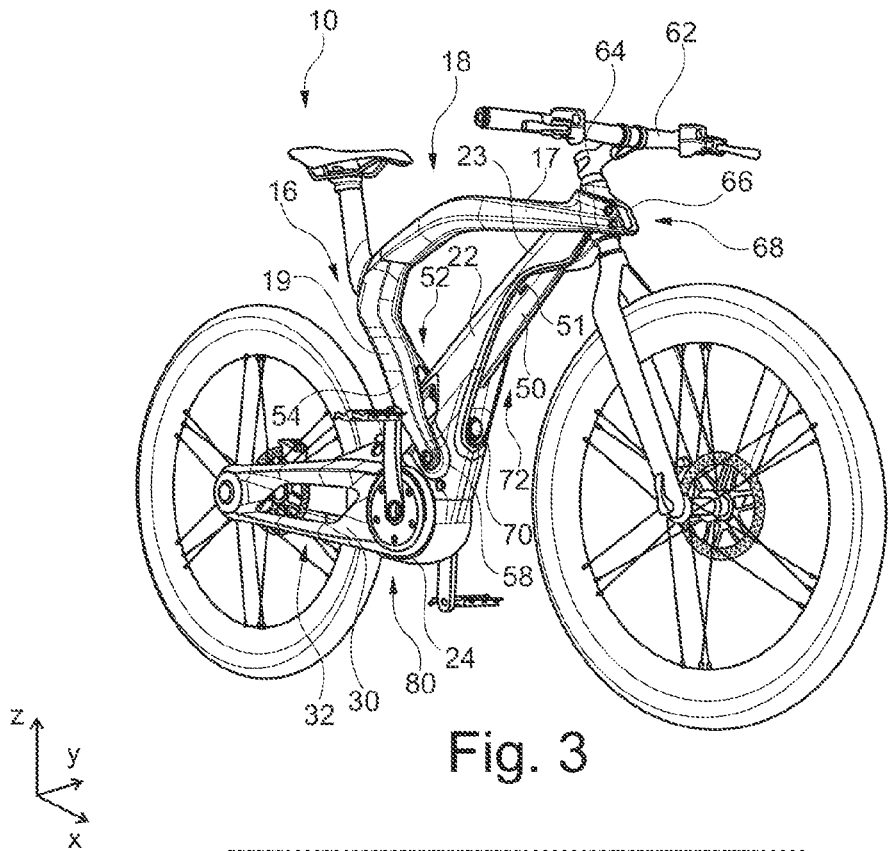
FIG. 3 is another perspective view of the electric bicycle of FIG. 1 when viewed obliquely from in front.
Figure 4:
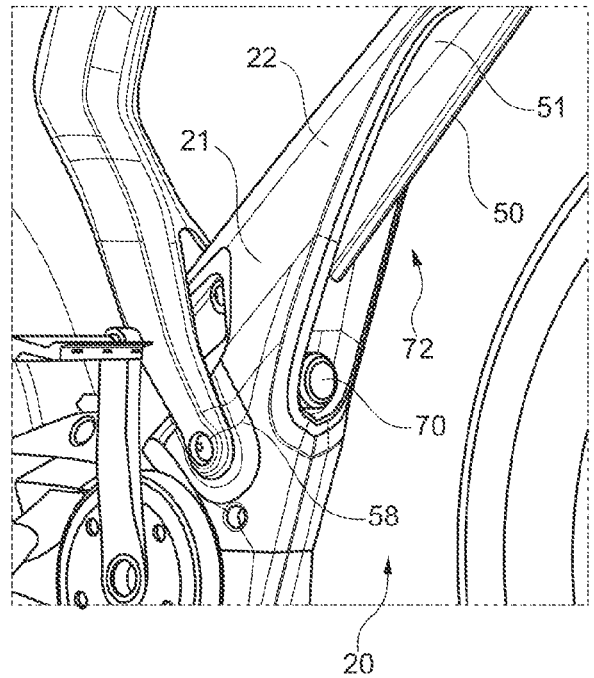
FIG. 4 is an enlarged view of a lower tube section of the electric bicycle of FIG. 1 in a region of a receptacle for an energy storage system, in accordance with an exemplary embodiment.

The two-wheeler shown in FIGS. 1 to 3, which is configured as an electric bicycle, comprises, in addition to a frame 16, a front wheel 12 and a rear wheel 14. The frame 16 in this case is configured to be at least two-component. It has a drive unit 20 configured as a frame component and an upper frame 18 connected to this, which is configured to be clip-shaped. In addition, on the drive unit 20 shown separately in FIG. 4, there is pivotably mounted a rear swing arm 30 which receives the rear wheel hub with its end section facing away from the drive unit 20.

Furthermore, a saddle support 46 with a saddle 48 is disposed on the upper frame 18. The front wheel 12 is mounted in a fork 60, which is connected to the frame 16 in the region of a control head section 66. The running wheels 12, 14 are further provided with brakes 36, 38, which are configured, for example, as hydraulically actuatable disc brakes.

The two-wheeler 10 can furthermore have a shifting system 34, which for example can be configured as a hub or chain shifting system. Power transmission between the bottom bracket 24, the crank 26 mounted there, and the rear wheel 14 can be accomplished by means of a chain or by means of a belt 32.

In an embodiment, the frame 16 or an upper main frame triangle is formed here by the drive unit 20 and the upper frame 18 connected to this. The drive unit 20 here comprises a base part 21, which functions as a receptacle for an electric motor 80 merely indicated in FIGS. 1 to 3 and also for an energy storage system 50, which is, for example, configured in the form of one or more rechargeable batteries. The base part 21 here preferably comprises a bottom bracket section 24 which receives a bottom bracket 25 and a lower tube section 22 preferably connected to this in one piece, which extends from the bottom bracket section 24 longitudinally and obliquely upward, in the region of the control head section 66.

In an embodiment, the lower tube section 22 is configured to be largely rectilinear on its side facing the upper frame 18. On its lower side facing the front wheel 12, however it has a shaft-like recess 72 which can be seen in FIG. 3, which serves for the detachable receipt of the energy storage system 50. The recess 72 is configured to be largely curved here, in order to give the lower tube section 22 the most aesthetic possible appearance and a high torsional rigidity.

The integration and fastening of the energy storage system in the recess 72 can shift the comparatively heavy energy storage system possibly configured in the form of a rechargeable battery relative to the frame geometry into a position near the center of gravity so that the center of gravity of the entire frame lies as low as possible.

As is further shown in FIG. 3, in an embodiment, a plug connection 70 for a charging cable is provided in the region of a front face of the recess 72 facing the bottom bracket section 24, by means of which the energy storage system 50 can be charged by connecting a charging cable even in a position mounted in or on the lower tube section 22. The plug connection 70 can in this case be configured as a magnetic plug.

As shown in FIG. 1, the energy storage system 50 can have a shape corresponding to the lower tube section 22 so that, for example, a housing section of the energy storage system 50 facing the front wheel 12 extends substantially parallel to the upper boundary of the lower tube section 22 facing the upper frame. Provided on the base part 21 adjoining the lower tube section 22 downward is the bottom bracket section 24, which receives a bottom bracket 25 coupled to cranks 26 and pedals 28 and also an electric motor 80. The electric motor 80 and the energy storage system 50 are jointly fastened to the base part 21. The base part 21 is further configured here as a supporting component of the frame 16.

In an embodiment, the base part 21 or the drive unit 20 so to speak forms a mounting platform or mounting base for the frame 16, therefore for the entire two-wheeler 10. Further frame components such as, for example, the upper frame 18 and the rear swing arm 30 should only be considered here to be attachment parts, which can be adapted individually to different needs according to the envisaged size and envisaged intended use of the two-wheeler 10. In this way, a generic drive unit 20 can be used for a plurality of different two-wheelers 10.

The two-wheeler, configured as an electric bicycle, can, for example, be configured as a mountain bike, as an all-terrain bike, as a city bicycle and as a cruiser or as a racing bicycle. One and the same drive unit 20 can be used for all these various types of bicycle so that the drive unit 20 can be manufactured in large numbers and inexpensively in mass production.

The base part 21 can here in particular be configured as a metal casting or as a housing for the electric motor 80 milled from a metal block and also for the energy storage system 50 to be arranged detachably hereon. However, it is also feasible that the base part 21 is formed from a plurality of stamped and correspondingly formed, interconnected metal plates.

The rear swing arm 30 which has two parallel legs between which the rear wheel 14 is mounted can be mounted, for example, pivotably on the bottom bracket section 24 of the base part 21, where an axis of rotation of rear swing arm 30 and base part 21 coincides with the bottom bracket 25. In the configuration according to FIGS. 1 to 3, the rear swing arm 30 is further coupled to the lower tube section 22 of the base part 21 via a damping element 40. The damping element 40 is preferably configured here as a hydraulic or as a gas compression spring and extends between a fastening section 44 on the rear swing arm side and a fastening section 42 provided at a lower end of the lower tube section 22.

In an embodiment, the upper frame 18 has an approximately C-shaped or curved contour. A downwardly projecting lower section 19 is here fastened in a transition region between bottom bracket section 24 and lower tube section 22 of the base part 21 while the free end of an upper section 17 is connected to a free and upper end section 23 of the lower tube section 22 of the base part 21. The connection of upper section 17 and the upwardly projecting end section 23 of the lower tube 22 here forms a control head section 66 of the frame 16, which further receives the steering head 64, a headset 65 and the fork 60.

The lower section 19 of the upper frame 18 is here fastened approximately in the transition region between the bottom bracket section 24 and the lower tube section 22 on the base part 21. As can be seen by reference to FIGS. 2 and 3, the upper frame 18 in the overlap region with the base part 21 has a fork-like structure with two lateral legs 54, 56, which laterally enclose the base part 21 or a fastening section 58 provided there at least in certain areas. The damping element 40 in this case also comes to lie between the laterally outwardly projecting legs 54, 56 of a corresponding fork section 52 of the upper frame 18.

The saddle support 46 extends approximately in rectilinear extension of the legs 54, 56 and is in this respect connected in a transition region or curvature section 15 between lower section 19 and upper section 17 of the upper frame 18.

In an embodiment, a mobile terminal 100, for example, can be detachably fastened on the upper section 17, facing the handlebars 62.

As shown in FIGS. 1 and 3, the control head section 66 of the upper section 17 can project from the fork 60, at least slightly forward. The two half-shells 18a, 18b of the upper frame 18 can in this case form a receptacle possibly for a lighting module 68. The steering head 64 is further connected in a manner known per se to handlebars 62.

In an embodiment, the energy storage system 50 provided as a rechargeable battery exchangeably on or in the lower tube section 22 can have a lateral fluting 51 which serves as a handle for gripping the energy storage system 50 and is intended to facilitate its removal and re-insertion into the shaft-like recess 72 of the lower tube section 22.

The enlarged sectional view of the drive unit 20 according to FIG. 5a shows the detachable arrangement of the energy storage system 50 configured as a rechargeable battery in the shaft-like receptacle or recess 72 of the lower tube section 22 which is open toward the bottom. In addition, an electrical connection 70 preferably configured as a magnetic plug is shown on a lower front face of the recess 72. The control device 110 is further indicated in FIGS. 3 and 4, this device preferably being disposed inside the drive unit 20 at an almost arbitrarily selectable point suitable for this purpose.

FIG. 5b, in another embodiment, shows the connection and integration of the control device 110 on the drive unit 20 shown isolated there and its connection to further components of the electric bicycle 10 in the manner of a block diagram. Thus, in particular an electromechanically actuatable actuator 120 is provided, which cooperates with a fastening element 114 disposed at the upper end of the recess 72.

The fastening element 114 provided on the side of the drive element 20 is here configured to cooperate detachably with a fastening element 112 of the energy storage device 50 which corresponds with this and is located opposite thereto in the mounting position. In addition, at a lower end of the recess 72, approximately in the vicinity of the plug connection 70, another fastening element 118 can be provided, which can cooperate with a fastening element 116 corresponding with this, which is provided on the energy storage device 50.

In an embodiment, the control device 110 can further be coupled to a lighting module 68, which is preferably disposed in or on the control head section 66 of the upper frame 18. Electrical energy extractable from the energy storage device 50 can thus be fed to the lighting module 68 via the control device 110.

Figure 7:
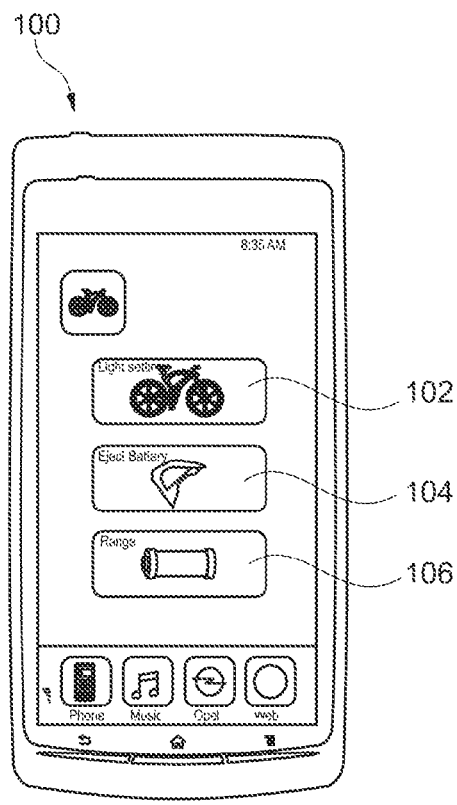
FIG. 7 is a front view of a graphical surface of a mobile terminal for triggering a control device, in accordance with an exemplary embodiment.

In particular however, the control device 110 is connected to a terminal 100 which is preferably configured to be mobile, shown in FIG. 7, for example as a Smartphone, or can be connected to such a terminal. The mobile terminal 100 can exchange data in a wired and also wireless manner with the control device 110 in order to provide either data relating to the operating state of the electric motor 80 or information possibly about the charging state or about the range of the energy storage device 50 via the terminal 100 to a user.

It is further provided in an embodiment that the control device 110 is also coupled to the electric motor 80. The coupling of the control device 110 to the electric motor 80 and also to the actuator 120 pertaining to the locking mechanism preferably serves to lock, block or release a locking or unlocking mechanism 112, 114 and to actuate the electric motor 80. Merely the structure and the mutual identification between control device 110 and terminal 100 can already be sufficient to release all the functions, possibly for the removal or for the insertion of an energy storage device 50 and also for activation of the electric motor 80.

However, further security interrogations can also be provided individually so that to exchange the energy storage device 50 the end user must, for example, select a corresponding function at the terminal 100 or input a release code required for this.

FIGS. 6a and 6b again show in perspective view the removal of an energy storage device 50, for example, configured as a rechargeable battery. The energy storage device 50 configured with a lateral fluting 51 serving as a handle or correspondingly configured projections or recesses can be gripped at any time by the end user as a result of the curved recess 72. With a lower end section and with a fastening element 116 provided there, the rechargeable battery can be pivotably connected at a fastening element 118 or counter-fastening element provided pivotably on the drive unit 20 and corresponding herewith.

In an embodiment, a locking mechanism is provided here by the fastening element 112 provided at the upper end of the recess 72 or on the upper end section of the energy storage device 50 together with the fastening element 114 corresponding herewith. The fastening elements 112, 114, 116, 118 can be common lock and closure components such as, for example, lock brackets, eyelets, eyes, hooks, and bolts, where at least one of the fastening elements 114 can be actuated by means of an actuator 120. As a modification of a positive connection which can be provided by the fastening elements 112, 114, 116, 118, nonpositive connecting mechanisms such as magnetically implemented connection or locking mechanisms can also be implemented.

As soon as the actuator 120 in mutual engagement releases the fastening elements 114, 112 corresponding to one another, the energy storage device 50 can be pivoted out possibly with its lower end as axis of rotation initially with its upper end section from the shaft-like recess 72, at least in certain sections before a mutual connection of the fastening elements 116, 118 is released for the final removal of the energy storage device 50.

FIG. 7 shows an example view of the graphics surface of a feasible mobile terminal 100. The mobile terminal 100 show here is in particular configured as a Smartphone. Here it can be provided in particular that directly by making a coupling or a connection between the terminal 100 and the control device 110 provided on the electric bicycle side, the mobile terminal 100, independently or at the request of the end user, starts an application or a corresponding program adapted to the operation of the electric bicycle 10 and configured for this.

As shown in FIG. 7, the application can, for example, have three icons 102, 104, 106 or corresponding displays. By selecting the icons 102, 104, 106, either various submenus can be retrieved or individual functions of the electric bicycle can be activated directly. The icon 102 is used, for example, for switching on and off the lighting module 68. The icon 104 is used for changing the energy storage device 50 while the icon 106 is merely used, for example, as a display for visualizing the charging state of the energy storage device 50.

Figure 8:
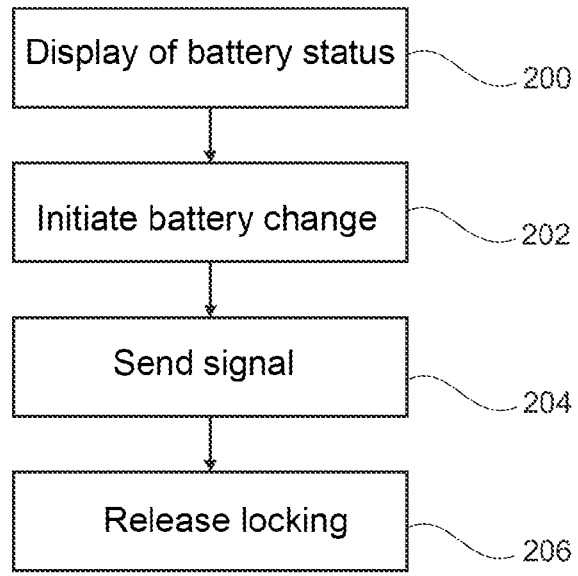
FIG. 8 is a flow diagram of a method for operating the electric vehicle in accordance with an exemplary embodiment.

In an exemplary embodiment, the flow diagram according to FIG. 8 illustrates in four successive steps 200, 202, 204, 206 for example the removal of an energy storage device. Here in a first step 200 the charging state of the energy storage device 50 is displayed. In a following step 202 the end user initiates a change of the energy storage device, possibly by selecting the icon 104 shown in FIG. 7. In response to this, the terminal 100 generates a corresponding signal and sends this to the control device 110. In response to the receipt of the signal, possibly following a previously made authorization, the control device 110 activates the actuator 120 and thereby releases a locking of the energy storage device 50 formed by the fastening elements 112, 114.

In the following and final step 206, the end user can remove the energy storage device 50 from the drive unit 20 in the manner shown, for example, in FIG. 5b and FIG. 6b.

Figure 9:
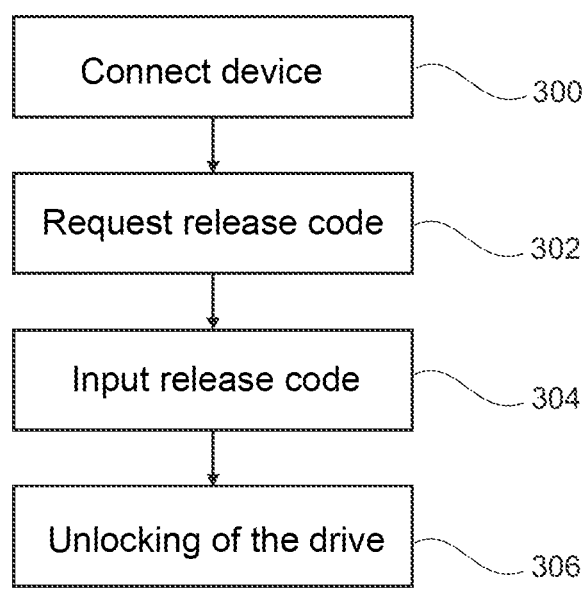
FIG. 9 is a flow diagram of a method for operating the electric bicycle, in accordance with an exemplary embodiment.

In another embodiment, the flow diagram shown in FIG. 9 shows a starting up of the electric bicycle, where in a first step 300 the terminal 100 is connected to the control device 110.

After making a connection between the control device 110 and the terminal 100, a release code is requested at the terminal 100 in step 302. In the following step 304 the end user enters the release code so that, following this, in step 306 the drive unit 20 and with this the electric bicycle 10 can be unlocked.

It should finally be noted that the particular configuration of the electric bicycle 10 shown for example in FIGS. 1 to 4 is merely a possible example for the practical implementation of the claimed control device, the drive unit and the method as well as the compute program product. The claimed control device, the drive unit as well as the method and the compute program product as well as their cooperation with a mobile terminal, in particular with a Smartphone, are generally applicable for any feasible type of electric bicycle and can be implemented accordingly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A drive unit for an electric bicycle comprising an electric motor and an energy storage device, the drive unit comprising:
    a locking mechanism for locking the energy storage device to the electric bicycle;
    a motor mechanically coupled to pedals of the electric bicycle; and
    a control device wherein the control device is operatively connected to an actuator of the locking mechanism for the energy storage device, wherein the actuator is fastened detachably to the drive unit, and wherein the control device is configured to evaluate signals received via a terminal in order to release the energy storage device from the electric bicycle and block or release rotation of the motor as a function of at least one received signal such that the motor prevents rotation of the pedals when the motor rotation is blocked.

2. The drive unit according to claim 1, wherein the control device is configured to transfer the locking mechanism into a release configuration only when a predefined unlocking signal is received via the terminal.

3. The drive unit according to claim 1, wherein the control device is configured to block any activation of the electric motor until a predefined release code is received via the terminal.

4. The drive unit according to claim 1, wherein the control device is configured to interrogate a current operating status of the electric motor and/or the energy storage device and to transmit a determined operating state to the terminal.

5. The drive unit according to claim 1, wherein the control device is configured for wired and/or wireless communication with the terminal.

6. An electric bicycle comprising:
    an electric motor mechanically coupled to pedals of the electric bicycle;
    an energy storage device:
    a drive unit comprising:

a locking mechanism for locking the energy storage device to the electric bicycle; and a control device operatively connected to the electric motor, wherein the control device is operatively connected to an actuator of the locking mechanism for the energy storage device, wherein the actuator is fastened detachably to the drive unit, and wherein the control device is configured to evaluate signals received via a terminal in order to release the energy storage device from the electric bicycle and block or release rotation of the electric motor as a function of at least one received signal such that the motor prevents rotation of the pedals when the motor rotation is blocked.

7. The electric bicycle according to claim 6, wherein the control device is configured to transfer the locking mechanism into a release configuration only when a predefined unlocking signal is received via the terminal.

8. The electric bicycle according to claim 6, wherein the control device is configured to block any activation of the electric motor until a predefined release code is received via the terminal.

9. The electric bicycle according to claim 6, wherein the control device is configured to interrogate a current operating status of the electric motor and/or the energy storage device and to transmit a determined operating state to the terminal.

10. The electric bicycle according to claim 6, wherein the control device is configured for wired and/or wireless communication with the terminal.

11. A method for operating an electric bicycle that comprises an electric motor mechanically coupled to pedals of the electric bicycle, an energy storage system, and a drive unit having a control device, wherein the control device is configured to evaluate signals received via a terminal in order to release or block one function of the drive unit as a function of at least one received signal, wherein the method comprises the steps of:
   connecting the terminal to the control device;
   transmitting a signal corresponding to a function command from the terminal to the control device;
   releasing the energy storage system from the electric bicycle as a function of the signal received by the control device; and
   releasing or blocking a rotation of the electric motor as a function of the signal received by the control device such that the motor prevents rotation of the pedals when the motor rotation is blocked.

12. The method according to claim 11, wherein an unlocking function for releasing the energy storage system from the drive unit is provided on the terminal and wherein as a result of an activation of the unlocking function, the energy storage system is removable from the drive unit.

13. The method according to claim 11, wherein the terminal is configured for interrogating a user identification and the terminal and/or the control device only release an operation of the electric motor upon input of a predefined user identification or a predefined release code.

14. The method according to claim 11, wherein the control device sends a warning signal to the terminal in an event of unauthorized use of the electric bicycle.

15. The method according to claim 11, wherein connecting the terminal comprises connecting a mobile multifunctional terminal.

16. The method according to claim 15, wherein connecting the terminal comprises connecting a Smartphone.

17. A computer readable medium embodying a computer program product for operating a two-wheeler that comprises an electric motor mechanically coupled to pedals of the two-wheeler, an energy storage system, and a drive unit having a control device, wherein the control device is configured to evaluate signals received via a terminal in order to release or block one function of the drive unit as a function of at least one received signal, the computer program product comprising:
   a computer program, the computer program configured to:
      connect the terminal to the control device;
      transmit a signal corresponding to a function command from the terminal to the control device;
      release the energy storage system from the electric bicycle; and
      release or block a rotation of the electric motor based on the signal received from the control device such that the motor prevents rotation of the pedals when the motor rotation is blocked.

* * * * *